3,672,866
USE OF N-(SEC-BUTYL)-4-(t-BUTYL)-2,6-DINITRO-ANILINE AS A SELECTIVE HERBICIDE
John Joseph Damiano, Springfield, Pa., assignor to Amchem Products, Inc., Township of Lower Gwynedd, Montgomery County, Pa.
No Drawing. Continuation-in-part of application Ser. No. 878,583, Nov. 20, 1969. This application Nov. 12, 1970, Ser. No. 89,010
Int. Cl. A01n 9/20
U.S. Cl. 71—121   1 Claim

ABSTRACT OF THE DISCLOSURE

Novel herbicidally active 4-butyl-2,6-dinitroaniline derivatives are prepared by nitration of 4-butylphenol, followed by conversion of the resulting 2,6-dinitrophenol into the chloro-derivative and finally reacting the chloro-derivative with a primary amine.

---

This application is a continuation-in-part application of application Ser. No. 878,583 filed Nov. 20, 1969.

This invention relates to novel mono-N-substituted derivatives of 4-(sec-butyl)-2,6-dinitroaniline and 4-(t-butyl)-2,6-dinitroaniline and to the herbicidal and plant growth uses of such compounds; and to novel formulations containing them.

Certain known 2,6-dinitroaniline derivatives have obtained importance in recent years inasmuch as they have been found to have high herbicidal activity and thus to serve well for the elimination of grasses and broadleaf plants infesting drainage ditches, gravel walks, road shoulders or wooded areas. These dinitroaniline derivatives are also suitable as herbicides between rows of crops in corn, cotton or soybean fields, strawberry patches and similar crop-bearing areas, provided these herbicides are applied in such a way that they do not harm the crop-bearing plants. Still another advantageous use of the herbicidal properties of these dinitroaniline derivatives is to employ them as preemergence herbicides at the time of planting of such crop plants as corn, cotton, soybeans, wheat, sugar beets, and the like. When thus applied, the dinitroaniline derivatives will eliminate the germinating weeds without adversely affecting the germination and growth of the desired crop plants.

Among the dinitroaniline derivatives which have found commercial acceptance, $\alpha,\alpha,\alpha$-trifluoro-2,6-dinitro-N,N-dipropyl-p-toluidine, also known as trifluralin and 4-(methylsulfonyl)-2,6-dinitro-N,N-dipropylaniline, also known as nitralin, are being used as preemergence herbicides on cotton, soybeans, dry beans, sugar beets, peas and other crops. Other specific dinitroaniline derivatives which have been suggested for controlling weeds in crop areas include 2,6-dinitroaniline itself and its N-ethyl and N-n-propyl derivatives, 2,6-dinitro-p-toluidine and its N,N-di-n-propyl and -diallyl derivatives. Compounds of this type are disclosed for example in U.S. Pats. 3,111,403, 3,257,190, 3,403,180 and 3,449,111 and German patent publication DAS 1,300,727.

In spite of the good herbicidal activity of these dinitroaniline derivatives, none of them is entirely satisfactory in every respect. Some of them are too costly to allow widespread and general application since they are only available through complicated synthesis techniques which involve several steps that give relative low yields. The preparation of still other derivatives involve unstable nitro-derivatives, the handling of which is hazardous and dangerous. Some of the dinitroaniline derivatives recommended as herbicides are not sufficiently selective in their activity and too often they also affect adversely the crop plants even if care has been taken to use the chemicals at their lowest effective level and to avoid direct contact with the crop plants.

Generally speaking those dinitroaniline derivatives which have proven to be commercially acceptable are the N,N-disubstituted derivatives and particularly those having a functional group other than alkyl, for example halo, haloalkyl, methylsulfonyl and the like, para to the amino group. Among the N,N-disubstituted compounds of the prior art having an alkyl substituent para to the amino group the methyl derivative has been generally found to be more effective than the higher alkyls, e.g. propyl or butyl. Accordingly, prior investigators have turned to dinitro derivatives having as noted above functional groups other than alkyl in para position or no functional group and where alkyl derivatives have been explored, experience has favored the shortest carbon chain derivatives. Similarly in the case of the substituents on the nitrogen atom the di-substituted derivatives have been favored over mono-substituted derivatives.

In accordance with this invention it has been found that notwithstanding the experience with N,N-disubstituted derivatives wherein an increase in the size of the alkyl substituent in para position diminishes herbicidal effectiveness there can be obtained "herbicidally active" compounds of unusually high activity and particularly good selectivity in a variety of agronomic crops when a branched chain butyl substituent, particularly the t-butyl, is introduced in para position of 2,6-dinitroaniline with N-mono-alkyl substitution. The N-monoalkyl derivatives, especially the N-propyl and N-butyl derivatives, and particularly the isopropyl, sec-butyl and t-butyl derivatives have proven to be unusually effective herbicides with respect to both weed control and crop safety, growth and yield. The herbicidal effectiveness of the N-mono substituted compounds of this invention is particularly surprising when compared to the effectiveness of the corresponding N,N-disubstituted derivatives. For example the 4 - t-butyl-N-sec-butyl-2,6-dinitroaniline of this invention has been shown to possess unique selective herbicidal properties whereas the corresponding 4 - t-butyl-N,N-di(sec-butyl)-2,6-dinitroaniline is lacking any practical herbicidal activity.

Accordingly, it is the object of my invention to provide certain new compounds which are highly effective as herbicides and which can be readily prepared by a convenient synthetic process and which compounds when employed as herbicides have demonstrated minimal or, essentially, no deleterious effect on crop plants. Another object of my invention is the provision of active dinitroaniline derivatives the synthesis of which does not require hazardous operations or raw materials or intermediates not readily available. It is a more specific object of my invention to provide N-mono-alkyl derivatives of 4-t-butyl-2,6-dinitroaniline and 4-sec-butyl-2,6-dinitroaniline. Other objects of my invention will be apparent from the description that follows.

The novel compounds of this invention are represented by the general formula:

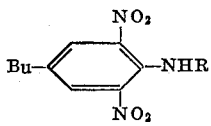

(IV)

wherein Bu represents t-butyl or sec-butyl and R is selected from the group consisting of lower alkyl, cyclo-lower alkyl, cyclo-lower alkyl lower alkyl, lower alkenyl, lower alkynyl, lower-alkoxy-lower-alkyl and di-lower-alkoxy-lower-alkyl.

As used herein the term alkyl connotes both straight and branched chain hydrocarbons containing 1 to 6 carbon atoms such as methyl, ethyl, propyl, isopropyl, n-butyl, sec-butyl, t-butyl, n-amyl, sec-amyl, hexyl, etc.; alkyl groups of 3 to 6 carbon atoms are preferred, more preferable are the branched 3 and 4-carbon groups i-propyl, sec-butyl and t-butyl; the term cycloalkyl denotes monocyclic saturated hydrocarbons having 3 to 6 carbon atoms; such as cyclopropyl, cyclopentyl, cyclohexyl; the term cyclo-lower alkyl lower alkyl denotes groups such as cyclopropyl methyl, cyclohexylmethyl, etc. The term lower alkenyl denotes straight or branched chain hydrocarbons having 3 to 4 carbon atoms and at least one double bond such as allyl, 2-butenyl, 3-butenyl, pentenyl, hexenyl and the like; the term lower alkynyl denotes straight or branched chain hydrocarbons having 3 to 4 carbon atoms and at least one triple bond such as propynyl, 2-butynyl, 3-butynyl, pentynyl and the like; the term lower-alkoxy-lower-alkyl denotes a $CH_3(CH_2)_m\text{—}O\text{—}(CH_2)_n$-group wherein $m$ is 0 or 1 and $n$ is an integer from 1 to 6, such as methoxymethyl, methoxyethyl, methoxypropyl, methoxyisopropyl, ethoxymethyl, ethoxyethyl, ethoxypropyl, ethoxyisopropyl, etc.; the term di-lower-alkoxy-lower-alkyl denotes a $(CH_3(CH_2)_m\text{—}O)_2\text{—}C_n\text{—}H_{2n1}$-group wherein $m$ and $n$ have the same meaning as above such as dimethoxymethyl, dimethoxyethyl, dimethoxypropyl, dimethoxyisopropyl, diethoxymethyl, diethoxyethyl, diethoxypropyl, diethoxyisopropyl, etc.

The 4-t-butyl compounds of this invention are represented by the formula:

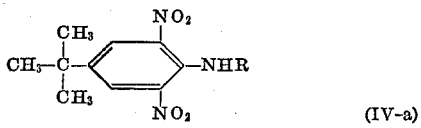

(IV-a)

wherein R has the same meaning as above; constitute a preferred group. Those compounds wherein R is lower alkyl are for various reasons most advantageous.

Of this group the compound where R is methyl was least active and accordingly the preferred group of 4-t-butyl derivatives are those wherein R is alkyl of 2 to 6 carbon atoms and those compounds wherein R is a branched chain lower alkyl preferably sec-butyl or i-propyl constitute an especially preferred group.

The novel mono-n-substituted-4-(t-butyl)-2,6-dinitroaniline and 4-(sec-butyl)-2,6-dinitroaniline derivatives which constitute this invention are synthesized by an especially facile route which takes advantage of readily accessible dinitrophenol derivatives as the intermediates.

The reaction sequence is shown graphically in the following schematic diagram:

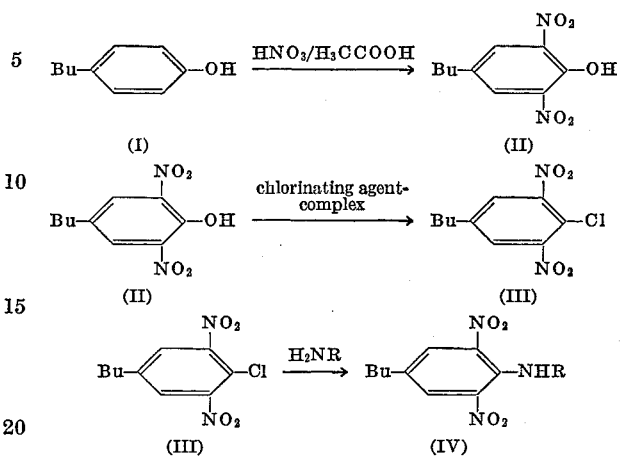

In the first step of the process a para-t-butylphenol or a para-sec-butylphenol, both of which are readily available, low cost starting materials, is nitrated by treating the phenol with nitric acid in acetic acid solution to give the corresponding 2,6-dinitrophenol in good yield. The nitration step follows known procedures for nitrating phenols as will be more fully apparent from the specific examples given hereinbelow.

The 2,6-dinitro-4-Bu-phenol obtained as above is then converted to the corresponding chloro compound of Formula III. This transformation which forms a key step in the process for preparing the novel compounds of this invention is accomplished by employing a chlorinating agent such as thionyl chloride, phosphorus oxychloride or phosphorus pentachloride in the presence of a complexing agent as described below. Such chlorination agents are well known in the art though it has been found that the above described chlorination is not effected under the usual reaction conditions previously known to the art, wherein the chlorination is accomplished by treating the phenol starting material with a chlorinating agent in an inert solvent. Thus for example, Capon and Chapman (J. Chem. Soc. 1957, p. 600) prepared 5-t-butyl-2,4-dinitrochlorobenzene from para-t-butyl-aniline by the reaction sequence involving acetylation, chlorination, Sandmeyer's reaction, and nitration. As another example the synthesis of 6-t-butyl-2,4-dinitrochlorobenzene may be mentioned which was accomplished (C.A. 50, 11260b) by nitrating 2-t-butylphenol, methylation of the resulting dinitro derivative, conversion of the methoxy compound into the amine, followed by diazotization and Sandmeyer's reaction. It has now been found that the chlorination of the 2,6-dinitro-4-Bu-phenol can be carried out by employing as the chlorinating agent a combination of one of the above mentioned chlorinating agents and an amide such as formamide, acetamide, propionamide or their alkylated derivatives, e.g. dimethyl formamide (DMF), etc. The chlorinating agent and acetamide are used in about equimolar amounts or if desired the chlorinating agent can be used in excess though the acetamide and chlorinating agent should ordinarily both be present in amounts equal to or greater than the 2,6-dinitro-4-Bu-phenol intermediate on a molar basis. The reaction is conveniently carried out in an inert organic solvent such as toluene, xylene and the like. A preferred reaction temperature is the reflux temperature of the reaction mixture (about 110 to 120° C.) though higher or lower temperatures can also be employed with correspondingly shorter or longer reaction times. The reaction is ordinarily completed in about 12 to 16 hrs. at which time the excess chlorinating agent can be readily stripped from the reaction mixture by evaporating under reduced (about 30 mm.) pressure. The desired chlorinated compound remains in the supernatant liquid, while the chlorinating agent-DMF complex separates as a heavy liquid and is easily removed from the liquid supernatant.

The product obtained in this way can be precipitated from an inert organic solvent such as n-hexane to give pure 2,6-dinitro-4-Bu-chlorobenzene in good yield.

In the final step of the reaction sequence the chlorinated intermediate of Formula III is converted to the desired herbicidally active derivative of Formula IV by treating with the appropriate primary amine. These amines are generally liquid and are soluble in the usual inert organic solvents such as toluene, xylene, alcohol and the like employed as the reaction medium. Where the amine is water soluble there can be conveniently employed an aqueous medium such as an alcohol-water solvent. The reaction is readily effected by adding dropwise a solution of the amine reactant in the appropriate solvent to the chlorinated intermediate also in the same solvent. The amine is ordinarily employed in an excess amount on a molar basis. Upon completion of the addition the mixture is refluxed until the reaction is completed. The course of the reaction can be followed by the formation of the hydrochloride salt of the unreacted amine which usually separates out as a solid precipitate. The precipitate is filtered out and the filtrate evaporated to dryness. The solid residue is recrystallized from an organic solvent such as methanol, ethanol or the like to give a pure product.

Following this general procedure and as will be specifically shown in the examples which follow, 2,6-dinitro-(4-sec-butyl)-chlorobenzene and 2,6-dinitro-(t-butyl)-chlorobenzene were reacted with inter alia the amines shown in Table I to give the corresponding compounds of Formula IV as shown.

Alternatively the novel compounds of this invention can, if desired, be prepared by treating the 4-butyl-2,6-dinitrophenol intermediate with p-toluene sulfonyl chloride or methyl sulfonyl chloride or similar reagent according to known methods to introduce a tosyl or mesyl or similar leaving group. The corresponding tosylate or similar derivative can be readily aminated by known procedures.

TABLE I

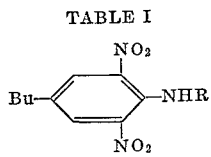

| No. | Amino reactant | Bu | R | Melting Point, °C. |
|---|---|---|---|---|
| 1 | Methylamine | t-Butyl | Methyl | 129–130 |
| 2 | Ethylamine | do | Ethyl | 70–73 |
| 3 | i-Propylamine | do | i-Propyl | 71–73 |
| 4 | n-Butylamine | do | n-Butyl | 63–65 |
| 5 | sec-Butylamine | do | s-Butyl | 60–62 |
| 6 | t-Butylmaine | do | t-Butyl | 81–83 |
| 7 | t-Pentylamine | do | t-Pentyl | 49–56 |
| 8 | Isopentylamine | do | i-Pentyl | 38–40.5 |
| 9 | Allylamine | do | Allyl | 56–58 |
| 10 | 3-methoxypropylamine | do | Methoxy propyl | 41–45 |
| 11 | 2,2-dimethoxyethylamine | do | β,β-dimethoxyethyl | (¹) |
| 12 | Cyclohexylamine | do | Cyclohexyl | 89–90 |
| 13 | n-Hexylamine | do | n-Hexyl | Liquid |
| 14 | Cyclopropylamine | do | Cyclopropyl | 125–126.5 |
| 15 | Cyclopropylmethylamine | do | Cyclopropylmethyl | |
| 16 | Methylamine | sec-Butyl | Methyl | (¹) |
| 17 | Ethylamine | do | Ethyl | 44–45 |
| 18 | Isopropylamine | do | i-Propyl | Semisolid |
| 19 | sec-Butylamine | do | s-Butyl | (¹) |
| 20 | n-Butylamine | do | n-Butyl | Liquid |
| 21 | t-Butylamine | do | t-Butyl | 33–38 |
| 22 | Cyclohexylamine | do | Cyclohexyl | 65–67 |
| 23 | 2,2-dimethoxyethylamine | do | Dimethoxyethyl | Liquid |
| 24 | 3-methoxypropylamine | do | 3-methoxypropyl | Liquid |

¹ Dark organic liquid.

In its process aspect this invention comprises a novel method of eliminating germinating and seedling weed grasses and broadleaf weeds, stimulating plant growth and the use of novel herbicidal compositions for such methods. More particularly the process comprises selectively inhibiting growth of undesirable weed grasses and broadleaf weeds in fields prepared and planted with agronomic crops and providing enhanced crop growth. The novel herbicidal and plant growth stimulation method of this invention is accomplished by applying a herbicidally effective amount of a compound coming within the scope of the compounds defined by general Formula IV above to an area infested with weed grasses or broadleaf weeds in the seed, seedling or germination stage. The novel compounds of this invention and herbicidal formulations thereof are useful in eliminating weed grasses and broadleaf weeds from crop-bearing soils by preemergence and preferably by preplant incorporated application to areas prepared for planting such crops as corn, beans, potatoes, cotton, sorghum, tomatoes, asparagus, onions, cucurbits, cereal grains, peas, beets, peppers, sunflowers and related species. It is a particular advantage of the compounds of this invention that the growth of crop plants is not adversely affected by application of the compound at rates sufficient to provide control of weeds. These compounds and particularly the 4-t-butyl-N-sec-butyl-2,6-dinitroaniline have been found to be especially safe to vine crops, such as cucumbers, watermelons, pumpkins and the like; beans such as soybeans, dry beans, navy beans and others; corn, sorghum, potatoes and other crop species. This unexpected wide margin (3 to 6 or more lbs./a. difference) between application rate sufficient to destroy weeds and the rate at which even tolerable injury to crops is encountered is particularly noteworthy when compared to known dinitroaniline herbicides which generally can be employed only by tolerating acceptable level of crop injury to obtain the greater benefits of weed control. In field trials, areas planted with cucumbers, corn and potatoes have shown prosperous and vigorous growth of these crops when treated with amounts of a compound of this invention sufficient to inhibit the germination and growth of most weed species present.

In particular the compound 4-t-butyl-N-sec-butyl-2,6-dinitroaniline has been found to produce an enhanced growth effect on desirable crops, particularly cotton, beans (such as soybeans, dry beans, lima beans, etc.), potatoes, melons (such as cantaloupes, watermelons and the like) and other cucurbits (such as cucumbers, squash and the like), and others. This effect has been most noticeable in the warmer climates, especially in areas where soil temperatures are generally about 60° F. or greater.

More particularly, the enhanced growth effect obtained by treatment with 4-t-butyl-N-sec-butyl-2,6-dinitroaniline appears as a total growth stimulation greater than that ordinarily obtained as the result of eliminating competitive weeds only.

Crops planted in soil treated with 4-t-butyl-N-sec-butyl-2,6-dinitroaniline exhibit more vigorous healthy growth as well as a significant increase in crop yields which by comparison to hand weeded controls have shown to exceed the increased yield effect normally attributable to elimination of competition for nutrients due to the presence of undesirable weed species.

The mechanism by which 4-t-butyl-N-sec-butyl-2,6-dinitroaniline functions to achieve the enhanced growth effect on desirable crop species such as cotton, cucurbits, beans and the like, when applied at rates which are toxic to undesirable weed species such as giant foxtail, crabgrass, barnyard grass, Fall Panicum, annual rye and others is not entirely understood though it can be attributed to a physiological response by the plant in some cases and in other cases the elimination of one or more agroclimatic lesions, or a combination of these factors.

By agro-climatic lesions is meant such environmental factors normally present in the area of the seed bed as have an adverse but non-toxic effect upon the germinating seed and/or the growing plant such as soil fungi, bacteria, nematodes and the like as well as other pathogenic substances which might attack either the root system or the plant itself, suppressing the normal growth by weakening the plant or by interfering with the uptake of nutrients or other of the plant's normal growth functions. It includes also such other adverse conditions as temperature, light quality (wave length), photo period (plant response to length of day), humidity, etc.

The growth stimulation achieved by treatments with 4-t-butyl-N-sec-butyl-2,6-dinitroaniline is manifested not only by increased yield but by more hardy, vigorous and thriftier plants which are less susceptible to disease and other adverse climatic conditions. By comparison with other known 2,6-dinitroaniline herbicides plants treated with 4-t-butyl-N-sec-butyl-2,6-dinitroaniline do not show the root pruning effect characteristic of treatment with the known 2,6-dinitroaniline herbicides and contrasted to plants grown in plots treated with 4-t-butyl-N-sec-butyl-2,6-dinitroaniline have an enhanced root development particularly in the case of the number, size and vigor of the lateral roots. This increased growth stimulation effect observed with 4-t-butyl-N-sec-butyl-2,6-dinitroaniline is illustrated by the results of field tests described hereinbelow.

In addition to the benefits discussed above the novel compounds of this invention and more particularly the compound 4-t-butyl - N - sec-butyl-2,6-dinitroaniline has produced certain surprising and wholly unexpected results not previously demonstrated with any of the known dinitroaniline herbicide materials. This compound has been shown to be particularly effective against rhizome Johnson grass, a perennial species, and in this and other of its herbicidal applications it has been found useful when applied in the fall for weed control during the subsequent planting and growing season. In the case of fall applications it is of course desirable to utilize greater amounts and generally from about 3 to 12 lbs./acre depending upon the type of weed infestation, soil type and other factors. When applied to turf grasses in granular form it has been found to have a surprisingly beneficial effect as a preemergent crabgrass control agent. In this case the granular form has been found to be particularly more beneficial than the liquid application.

As discussed above this product does not exhibit root pruning effect characteristics of known 2,6-dinitroaniline herbicide materials and not only does it not have a root pruning effect but it displays positive enhancement of root development as compared to other known 2,6-dinitroaniline herbicidal materials. The N-s-butyl-4-t-butyl-2,6-dinitroaniline exhibits a wider safety margin between the rate that will injure plants of desirable crop species and rates at which total weed control can be obtained. This is particularly important in plants grown for seed production, where the low acreage of crop species permits the use of high rates of herbicidal materials, 6 to 8 lbs./acre or greater which rates could not ordinarily be used as an economic treatment for ordinary field crops. In this way the compound can be used to give complete control of noxious weeds particularly grasses, without injury to the crops. This wide safety margin also permits the use of higher than normal rates for elimination of hard-to-kill weed species, such as morning-glory and teaweed as well as black nightshade and cow cockle. By using this high rate for one or two seasons the weed population of these difficult to control weeds can be reduced to levels which are not detrimental to crops for several ensuing growing seasons under ordinary herbicide treatment.

In particular the compound N-s-butyl-4-t-butyl-2,6-dinitroaniline has been found to be particularly useful in controlling weeds in areas planted to such desirable crop species as beans, for example soybeans, lima beans, dry beans, southern peas, bush or snap beans, pinto beans, kidney beans, navy beans and the like, peanuts, tomatoes, cucurbits, such as cucumbers, watermelons, musk melons, cantaloupes, honeydews, squash, pumpkin and the like, peppers, tobacco, rice particularly transplanted rice, sweet potatoes, white or Irish potatoes, yams, safflowers, sunflower, castor beans, okra, sugar beets (application should be made as incorporated treatments after the beets are 4 to 6 inches tall or by preplant incorporation before the beets are planted), sugarcane (applied after planting cane with shallow incorporation), Cruciferae such as cabbage, broccoli, cauliflower, brussel sprouts, kale, rape, turnips, mustard, rutabaga and the like, Umbilliferae such as carrots, parsnips, dill, celery, parsley and the like, turf grasses and ornamentals, particularly annually flowering or established perennials in which case the compound is worked into the soil in the area surrounding the ornamental plant. The compound can be used for weed control in orchards by discing into the orchard to give excellent weed control for established fruit and nut trees. The compound is particularly effective for controlling such grasses as crabgrass, foxtail, barnyard grass, Fall Panicum, Johnson grass, cheatgrass, black grass (Alopecurus), spangle top (Brachiaria), red rice, witch grass, silver crab, annual bluegrass (*Poa annua*), annual ryegrass, and many of the broadleaf weeds, including pigweed, Florida pusley, chickweed, poor Joe, lambsquarter, carpet weed, teaweed, morning-glory, Kochia, smartweed and others.

This compound can be used to kill or control weeds such as black night shade and teaweed at rates selective to crops such as beans, which is not possible with known 2,6-dinitroaniline herbicide materials, such as trifluralin and nitralin. This wider safety margin and benefit of 4-t-butyl-N-sec-butyl-2,6-dinitroaniline, particularly as compared to the analogous disubstituted material, is shown by the following results obtained in field trials with this material in comparison with other 2,6-dinitroaniline herbicide materials. This ability of the 4-t-butyl derivatives having an N-branched chain alkyl group, and specifically the 4-t-butyl-N-s-butyl-2,6-dinitroaniline, to produce desirable plant growth in crop species together with other peculiar beneficial results obtained with this compound suggest that while its exact mode of action is not entirely understood it does possess highly unique biological characteristics. Its ability to inhibit growth of a broad spectrum of grass weeds and broadleaf weeds while permitting vigorous growth of crop species is demonstrated by the experimental results shown in Tables II through XX below. These results were obtained according to the procedures described hereafter.

HERBICIDAL ACTIVITY AND CROP SELECTIVITY OF N-s-BUTYL-4-t-BUTYL-2,6-DINITROANILINE

Test flats were prepared from soil blended with fertilizer, sand and peat moss and prepared for seeding in replicates of about 10 inches by about 20 inches and about 2 to 3 inches deep. The flats were seeded with the test species in rows, covered with soil and watered till moist to feel. The test chemical was sprayed on the surface of the flats before seeding, and incorporated into top 1 inch of soil. The results were observed by comparison to controls 4 to 5 weeks after seeding. The percent control in the case of grass weeds and broadleaf weeds is based upon the number and vigor of weeds emerging in the treated flat as compared to the untreated controls. Percent injury in the case of crop plants represents the extent of growth inhibition that can be observed by comparison of the crop plants in the treated soil and those in the untreated soil.

TABLE II.—2,6-DINITROANILINE DERIVATIVES OF FORMULA IV

| Bu | t-Bu | t-Bu | t-Bu | t-Bu | t-Bu | t-Bu | t-Bu | t-Bu | t-Bu | t-Bu | t-Bu | t-Bu | t-Bu | t-Bu | t-Bu | s-Bu | s-Bu | s-Bu | s-Bu | s-Bu | s-Bu | s-Bu | s-Bu |
|---|---|---|---|---|---|---|---|---|---|---|---|---|---|---|---|---|---|---|---|---|---|---|---|
| R | Me | Et | i-Pr | n-Bu | s-Bu | t-Bu | t-Pe | i-Pe | Allyl | Meth-oxy-propyl | Dime-thoxy-ethyl | t-Bu | h-Hexyl | Cyclo-propyl | Cyclo-propyl methyl | Me | Et | i-Pr | s-Bu | n-Bu | t-Bu | Cyclo-hexyl | Dime-thoxy-ethyl | Meth-oxy-propyl |
| Compound Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| Rate, lbs./A. | 16 | 16 | 8 | 8 | 8 | 8 | 8 | 8 | 8 | 8 | 8 | 8 | 16 | 8 | 8 | 8 | 8 | 8 | 8 | 8 | 8 | 8 | 8 | 8 |
| Test plant: | | | | | | | | | | | | | | | | | | | | | | | | |
| Downy Brome | 10 | 100 | 100 | 60 | 100 | 100 | 100 | 100 | 100 | 100 | 100 | 60 | 40 | 40 | 0 | 60 | 100 | 100 | 100 | 100 | 100 | 30 | 0 | 60 |
| Chickweed | 0 | 100 | 100 | 30 | 100 | 100 | 100 | 100 | 100 | 100 | 30 | 0 | 10 | 80 | 100 | 20 | 100 | 100 | 100 | 90 | 100 | 0 | 0 | 20 |
| Wild oats | 0 | 100 | 100 | 70 | 100 | 100 | 100 | 90 | 100 | 50 | 10 | 80 | 50 | 80 | 0 | 0 | 100 | 100 | 100 | 90 | 90 | 90 | 15 | 0 |
| Barnyard grass | 10 | 100 | 100 | 75 | 100 | 100 | 100 | 90 | 95 | 95 | 60 | 70 | 65 | 30 | 0 | 70 | 100 | 100 | 100 | 95 | 100 | 70 | 30 | 80 |
| Foxtail | 15 | 100 | 100 | 80 | 100 | 100 | 100 | 100 | 100 | 100 | 90 | 40 | 70 | 95 | 0 | 40 | 100 | 100 | 100 | 95 | 100 | 95 | 40 | 60 |
| Morning glory | 0 | 15 | 30 | 0 | 85 | 0 | 0 | 0 | 30 | 0 | 20 | 0 | 0 | 0 | 0 | 0 | 20 | 30 | 40 | 0 | 0 | 0 | 0 | 40 |
| Velvet leaf | 30 | 10 | 25 | 0 | 80 | 0 | 10 | 80 | 100 | 0 | 0 | 0 | 70 | 0 | 40 | 10 | 100 | 40 | 100 | 100 | 40 | 70 | 40 | 85 |
| Johnson grass | 10 | 10 | 100 | 85 | 100 | 90 | 10 | 95 | 100 | 90 | 30 | 70 | 85 | 0 | 0 | 90 | 100 | 100 | 100 | 95 | 100 | 70 | 35 | 95 |
| Pigweed | 20 | 0 | 100 | 95 | 100 | 100 | 90 | 100 | 100 | 70 | 80 | 30 | 0 | 0 | 0 | 100 | 100 | 100 | 100 | 100 | 100 | 20 | 100 | 60 |
| Lambs-quarter | 20 | 0 | 100 | 45 | 100 | 95 | 50 | 0 | 100 | 95 | 50 | 100 | 30 | 0 | 0 | 100 | 100 | 100 | 100 | 100 | 90 | 100 | 40 | 100 |
| Nutsedge | 10 | 100 | 100 | 100 | 100 | 100 | 100 | 100 | 100 | 0 | 0 | 0 | 0 | 100 | 0 | 70 | 70 | 10 | 10 | 0 | 100 | 0 | 30 | 100 |
| Alopecurus | 20 | 100 | 100 | 100 | 100 | 100 | 100 | 100 | 100 | 100 | 100 | 100 | 40 | 90 | 0 | 40 | 95 | 100 | 100 | 90 | 100 | 100 | 80 | 100 |
| Curled dock | 30 | 100 | 100 | 100 | 100 | 100 | 100 | 100 | 100 | 100 | 100 | 100 | 90 | 100 | 0 | 100 | 100 | 100 | 100 | 100 | 100 | 70 | 30 | 100 |
| Crabgrass | 30 | 100 | 100 | 100 | 100 | 100 | 100 | 100 | 100 | 100 | 100 | 95 | | 100 | 85 | 100 | 100 | 100 | 100 | 100 | 100 | 95 | 90 | 100 |

TABLE III.—HEBICIDAL ACTIVITY AND CROP SELECTIVITY OF COMPOUNDS OF FORMULA IV

| | Compound number | | | | | | | |
|---|---|---|---|---|---|---|---|---|
| | 2 | 3 | 5 | 6 | 9 | 17 | 18 | 19 | 21 |
| | Rate, pound/acre | | | | | | | | |
| Test plant | 2 | 1 | 1 | 2 | 1 | 1 | 1 | 1 | 1 |
| Pigweed | 95 | 100 | 100 | 40 | 15 | 15 | 30 | 85 | 0 |
| Foxtail | 95 | ----- | 100 | 45 | ----- | ----- | ----- | ----- | ----- |
| Wheat | 15 | 30 | 70 | 10 | 20 | 10 | 10 | 0 | 0 |
| Crabgrass | 100 | 100 | 100 | 100 | 80 | 80 | 100 | 100 | 25 |
| Corn | 20 | 20 | 20 | 20 | 25 | 0 | 20 | 10 | 0 |
| Velvetleaf | 0 | 0 | 30 | 0 | 0 | 0 | 0 | 0 | 0 |
| Johnson grass | 45 | ----- | 100 | 45 | ----- | ----- | ----- | ----- | ----- |
| Soybeans | 0 | 0 | 0 | 0 | 0 | 0 | 0 | 0 | 0 |
| Barnyard grass | 45 | 100 | 100 | 45 | 45 | 80 | 100 | 100 | 30 |
| Lambsquarter | 10 | ----- | 45 | 0 | ----- | ----- | ----- | ----- | ----- |
| Sugar Beets | 0 | 20 | 20 | 0 | 0 | 0 | 0 | 0 | 0 |
| Alfalfa | 0 | 15 | 20 | 0 | 0 | 0 | 15 | 10 | 0 |
| Fall Panicum | 95 | 100 | 100 | 25 | 100 | 90 | 100 | 100 | 45 |
| Cheatgrass | 90 | 100 | 80 | 0 | 80 | 70 | 85 | 100 | 0 |
| Cotton | 0 | ----- | 0 | 0 | ----- | ----- | ----- | ----- | ----- |
| Alopecurus | 100 | 100 | 100 | 90 | 95 | 95 | 100 | 100 | 80 |
| Chickweed | 25 | ----- | 95 | 0 | ----- | ----- | ----- | ----- | ----- |
| Cucumbers | 30 | 0 | 0 | 0 | 0 | 0 | 0 | 0 | 0 |
| Muskmelon | 0 | ----- | 0 | 0 | ----- | ----- | ----- | ----- | ----- |
| Morning Glory | 15 | 0 | 40 | 0 | 0 | 0 | 20 | 0 | 0 |
| Wild Mustard | 10 | ----- | 10 | 0 | ----- | ----- | ----- | ----- | ----- |
| Rice | 25 | 100 | 40 | 15 | 100 | 100 | 100 | 100 | 70 |
| Annual Rye | 90 | 100 | 90 | 30 | 85 | 90 | 100 | 100 | 30 |
| Cocklebur | ----- | ----- | 0 | ----- | 0 | 0 | 0 | ----- | 0 |
| Y. Nutsedge | 0 | ----- | 0 | ----- | ----- | ----- | ----- | ----- | ----- |
| Tomatoes | 0 | 0 | 20 | 0 | 0 | 0 | 0 | 0 | 0 |
| Onions | 0 | 95 | 20 | 0 | 15 | 0 | 25 | 20 | 0 |
| Giant Foxtail | 100 | ----- | ----- | ----- | 40 | 35 | 100 | 100 | 35 |
| B. Nightshade | 0 | ----- | ----- | ----- | 0 | 0 | 10 | 0 | 0 |
| Jimson | 0 | ----- | ----- | ----- | 0 | 0 | 0 | 0 | 0 |
| Coffeeweed | 100 | ----- | ----- | ----- | 0 | 0 | 25 | 25 | 0 |
| Chrysanthemum | 85 | ----- | ----- | ----- | 0 | 0 | 0 | 10 | 0 |
| Galium | 0 | ----- | ----- | ----- | 0 | 0 | 0 | 0 | 0 |
| Matricaria | 70 | ----- | ----- | ----- | 0 | 0 | 20 | 0 | 0 |
| Teaweed | 0 | ----- | ----- | ----- | 0 | ----- | 0 | ----- | 0 |
| Wild Oats | 100 | ----- | ----- | ----- | 40 | 25 | 100 | 10 | 0 |

TABLE IV.—CROP SELECTIVITY OF COMPOUNDS OF FORMULA IV

| | | Percent injury | | | | | |
|---|---|---|---|---|---|---|---|
| Compound | Lbs./a. | Soybeans | Tomatoes | Cotton | Corn | Sugar Beets | Cucumbers |
| 2 | 1 | 0 | 0 | 0 | 30 | 0 | 0 |
| 3 | 1 | 0 | 0 | 0 | 20 | 20 | 0 |
| 5 | 1 | 0 | 20 | 0 | 20 | 20 | 0 |
| 6 | 2 | 0 | 0 | 0 | 20 | 0 | 0 |
| 9 | 1 | 0 | 0 | 0 | 20 | 0 | 0 |
| 17 | 1 | 0 | 0 | 0 | 0 | 0 | 0 |
| 18 | 1 | 0 | 0 | 0 | 20 | 0 | 0 |
| 19 | 1 | 0 | 0 | 0 | 0 | 0 | 0 |
| 21 | 1 | 0 | 0 | ----- | 0 | 0 | 0 |
| 7 | 1 | 0 | 0 | ----- | 0 | 0 | 0 |
| 10 | 4 | 0 | 0 | 0 | 0 | 0 | 0 |
| 11 | 1 | 0 | 0 | ----- | 0 | 0 | 0 |
| 14 | 2 | 0 | 0 | 0 | 0 | 0 | 0 |
| 16 | 1 | 0 | 0 | ----- | 0 | 0 | 0 |

FIELD TEST SELECTIVITY OF N-s-BUTYL-4-t-BUTYL-2,6-DINITROANILINE

In a field test treatments were sprayed Aug. 6, at 17 g.p.a. All chemicals in one replication were incorporated 2 inches with a power-driven tillrovator. The ten crops and also four weed species, were planted the next day and evaluated one month later on Sept. 5. Subsurface soil was dry. There were two inches of rain during the first three weeks after treatment (1 inch plus 1 inch of irrigation two days after treatment).

TABLE V.—RESPONSE OF VARIOUS CROPS AND WEEDS TO PREPLANT INCORPORATED N-s-BUTYL-4-t-BUTYL-2,6-DINITROANILINE

| Treatment | Rate lb./a., a.i. | Cotton[1] | Soy-beans[2] | Southern peas[3] | Canta-loupe | Cucum-bers | Snap-beans | Seedling Johnson Grass | Crab-grass | Brachi-aria | Morning-glory | Coffee-weed |
|---|---|---|---|---|---|---|---|---|---|---|---|---|
| Tillrovated: N-s-butyl-4-t-butyl-2,6-dinitroaniline | 1.0 | 0 | 0 | 0 | 0 | 0 | 0 | 100 | 100 | 100 | 75 | 80 |

[1] DPL smoothleaf.
[2] Lee.
[3] Crowder.

THE EFFECT OF N-s-BUTYL-4-t-BUTYL-2,6-DINITROANILINE ON THE GROWTH OF COTTON, MELONS, TOMATOES AND CUCUMBERS

Methods and materials

Plans were grown in plastic pots in the greenhouse. There were five replications of one pot each. After spraying, the chemical was thoroughly mixed and incorporated into the soil with a mechanical mixer.

Seeds were planted ½ inch deep. The soil used would be classified as heavy soil.

The sprayer was equipped with an 8002 T-jet nozzle and delivered 40 gal. spray solution per acre.

Treated pots were watered by subirrigation to avoid any loss of chemical by leaching.

The trial was run in two phases. One lot of treated soil was planted immediately. A second lot of treated soil was retained and planted after three weeks.

Growth stimulation was observed and measured by comparison with the same crops grown in untreated soil.

TABLE VI.—EFFECT OF N-s-BUTYL-4-t-BUTYL-2,6-DINITROANILINE ON CROP GROWTH. APPLIED PREPLANT INCORPORATED. PLANTED IMMEDIATELY AFTER CHEMICAL TREATMENT

| Crop | Rate of N-s-Bu-4-t-Bu-2,6-dinitroaniline, lb./a. | Crop height 29 days after application, percent of check |
|---|---|---|
| Melons | ¾ | 118 |
| Do | 1.5 | 110 |
| Cucumbers | ¾ | 124 |
| Do | 1.5 | 128 |
| Tomato | ¾ | 137 |
| Do | 1.5 | 126 |
| Cotton | ¾ | 118 |
| Do | 1.5 | 124 |
| Untreated | 0 | 100 |

TABLE VII.—EFFECT OF N-s-BUTYL-4-t-BUTYL-2,6-DINITROANILINE ON CROP GROWTH. CHEMICAL APPLIED PREPLANT INCORPORATED. PLANTED THREE WEEKS AFTER TREATMENT

| Crop | Rate of N-s-Bu-4-t-Bu-2,6-dinitroaniline, lb./a. | Crop height 48 days after treatment and 27 days after planting, percent of check |
|---|---|---|
| Melons | ¾ | 114 |
| Do | 1.5 | 114 |
| Cucumbers | ¾ | 129 |
| Do | 1.5 | 104 |
| Tomato | ¾ | 160 |
| Do | 1.5 | 156 |
| Cotton | ¾ | 147 |
| Do | 1.5 | 138 |
| Untreated | 0 | 100 |

N-s-BUTYL-4-t-BUTYL-2,6-DINITROANILINE BEAN TRIAL 1.0 lb./a. of N-s-butyl-4-t-butyl-2,6-dinitroaniline formulated as a 4 lb./gal. active emulsifiable concentrate was applied prior to planting. The chemical was incorporated by double discing the soil to a depth of 3.5 inches. The standard rate of trifluralin ½ lb./a. was applied for comparison.

Location—Patterson, Calif.
Variety—Henderson baby lima beans
Plot Size—63' x 225'–0.325 a.
Harvest—Sept. 22
Volume—30 gal./a.

TABLE VIII.—YIELD OF BEANS

| Treatment | Yield per plot,/lbs. | 100 lb. bags/a. | Yield increase, percent |
|---|---|---|---|
| N-s-Bu-4-t-Bu-2,6-dinitroaniline 1 lb./a. | 1,020 | 31.4 | 25.6 |
| Trifluralin, ½ lb./a. | 812 | 25.0 | |

N-s-BUTYL-4-t-BUTYL-2,6-DINITROANILINE ON SOYBEANS

Location—Grenada, Miss.
Variety—Bragg
Treated—May 22; Preplant incorporated; N-s-butyl-4-t-butyl-2,6-dinitroaniline
Rate of N-s-butyl-4-t-butyl-2,6-dinitroaniline—1½ lb./a.
Rate of chloramben—2½ lb./a., Applied preemergence May 22
Soil—Sandy loam
Plot size—0.7 a.

The N-s-butyl-4-t-butyl-2,6-dinitroaniline plot was observed to be producing plants that were more robust and vigorous than the untreated check or the chloramben plot. Weed control was fine in N-s-butyl-4-t-butyl-2,6-dinitroaniline and chloramben plots but unsatisfactory in the untreated check. Weed competition repressed growth in the untreated plot. Chloramben is a standard weed control treatment and weed control was equal to N-s-butyl-4-t-butyl-2,6-dinitroaniline. No injury was observed from this standard treatment.

There was an obvious increase in plant growth later in the season on the N-s-butyl-4-t-butyl-2,6-dinitroaniline treatment and stalk diameter was evaluated. Results are shown in the table below.

Pods were harvested from the 10 average plants selected from 20 plants harvested at random.

TABLE IX.—SOYBEAN STALK DIAMETER AS AFFECTED BY N-s-BUTYL-4-t-BUTYL-2,6-DINITROANILINE (CM.)

| Sample Number: | N-s-butyl-4-t-butyl-2,6-dinitroaniline | Standard |
|---|---|---|
| 1 | 1.1 | 0.78 |
| 2 | 1.0 | 0.68 |
| 3 | 1.25 | 0.90 |
| 4 | 1.1 | 0.75 |
| 5 | 1.3 | 0.80 |
| 6 | 1.2 | 0.52 |
| 7 | 1.25 | 0.60 |
| 8 | 1.2 | 0.95 |
| 9 | 1.3 | 0.50 |
| 10 | 1.25 | 0.80 |
| 11 | 1.4 | 0.80 |
| 12 | 1.25 | 0.60 |
| Total | 14.60 | 8.68 |
| Average | 1.21 | 0.723 |
| Cm. diameter increase | 0.487 | |
| Percent increase in stem diameter (percent of standard) | 67.4 | 0 |

TABLE X.—SOYBEAN YIELDS AS AFFECTED BY N-s-BUTYL-4-t-BUTYL-2,6-DINITROANILINE

| Treatment | Yield | Increase in yield | Percent increase in yield |
|---|---|---|---|
| N-s-Bu-4-t-Bu-2,6-dinitroaniline | 6 lb. 8 oz | 4 lb. 6 oz | 205.8 |
| Standard | 2 lb. 2 oz | | |

N-s-BUTYL-4-t-BUTYL-2,6-DINITROANILINE SNAP BEANS

Location—Loveland, Colo.
Treatments established—May 15
Individual plots—20' x 50' in size
Incorporation method—Chisel cultivator followed by spike tooth harrow and roller mulcher, within 45 minutes of application.

TABLE XI

| Rate, lb./a. | Percent control | | Snapbean yield/plot (lbs.) | | | Percent of check |
|---|---|---|---|---|---|---|
| | Pigweed | Setaria | [1] I | [1] II | Total | |
| N-s-Bu-4-t-Bu-2,6-dinitroaniline; 1 | 90 | 100 | 15.2 | 13.3 | 28.5 | 125 |
| N-s-Bu-4-t-Bu-2,6-dinitroaniline; 1½ | 96 | 96 | 15.8 | 13.4 | 29.2 | 128 |
| N-s-Bu-4-t-Bu-2,6-dinitroaniline; 3 | 98 | 98 | 14.6 | 14.7 | 29.3 | 129 |
| Trifluralin; ¾ | 100 | 100 | 11.7 | 11.7 | 23.4 | 103 |

[1] Sample areas within each individual plot (1 row x 15 feet).

NOTE.—Bean yields taken from 2 rows x 15 feet.

N-s-BUTYL-4-t-BUTYL-2,6-DINITROANILINE ON COTTON

TEST A

Location—Greenville, Miss.
Rate/a.—3 lbs.
Soil—Medium loam
Planted—Apr. 30
Treated—Apr. 28
Variety—DPL Vegetative growth of cotton was enhanced as a result of the 3 lbs./a. treatment of N-s-butyl-4-t-butyl-2,6-dinitroaniline. Growth was observed to be increased from 10 to 50% when the cotton was 15" tall. The increase in growth was not only in height but in lateral growth also.

Test B

Location—Greenville, Miss.
Variety—DPL
Planted—Apr. 22
Treated—Apr. 20
Rate/a.—2 lbs.
Soil—Loam The N-s-butyl-4-t-butyl-2,6-dinitroaniline was compared with the untreated check and with ¾ lb./a. of trifluralin. The N-s-butyl-4-t-butyl-2,6-dinitroaniline treatment showed increased vigor and general robustness of the plants. Four independent observers picked the N-s-butyl-4-t-butyl-2,6-dinitroaniline plot as being superior to the untreated check or the trifluralin treatment. The increase in plant growth on the N-s-butyl-4-t-butyl-2,6-dinitroaniline plot was rated 15–20% above the check and the trifluralin treatment.

Test C

Location—Benoit, Miss.
Planted—May 11
Treated—May 10
Rate/a.—2 lbs.
Soil—Medium clay loam
Plot size—6 rows x 300

The N-s-butyl-4-t-butyl-2,6-dinitroaniline ws compared to an untreated check. Initially lateral root repression was observed on the seedling cotton in the N-s-butyl-4-t-butyl-2,6-dinitroaniline treated area. When the check row plants averaged 36" tall the N-s-butyl-4-t-butyl-2,6-dinitroaniline treatment was 48" to 54" tall. At this time the root development was excellent on the N-s-butyl-4-t-butyl-2,6-dinitroaniline cotton. The increase is root development indiacted root stimulation as the concentration of N-s-butyl-4-t-butyl-2,6-dinitroaniline was reduced by micro-organisms (typical growth regulator response). The 33.3% to 50% increase in plant size of the N-s-butyl-4-t-butyl-2,6-dinitroaniline cotton versus the check was partially due to the weed competition but the weed density could not account for all the difference according to expert observers.

POTATO YIELD TRIALS—N-s-BUTYL-4-t-BUTYL-2,6-DINITROANILINE

The test compound was preplant incorporated at 1½ lbs. per acre in plots 10' x 40' with potatoes planted in 4 rows in each plot. Weed control was excellent. Yield data is based on three replications for each treatment and controls. The potatoes from all plots were graded into market grade (No. 1 and Grade B) and culls. The increase in market grade potatoes (Grade B) treated with N-s-butyl-4-t-butyl-2,6-dinitroaniline is shown in percent of control and represents a significant increase over that obtained with the standard weed control application of ½ lb. trifluralin plus 2 lbs. EPTC.

TABLE XII.—N-s-BUTYL-4-t-BUTYL-2,6-DINITROANILINE ON POTATOES

| Treatment | Rate, lb./a., a.i. | Percent of control market grade potatoes | |
|---|---|---|---|
| | | No. 1 | Grade B |
| N-s-Bu-4-t-Bu-2,6-dinitroaniline | 1½ | 169 | 159 |
| Trifluralin plus EPTC | ½+2 | 169 | 128 |

CROP SELECTIVITY AND WEED CONTROL OF N - s - BUTYL - 4 - t - BUTYL - 2,6 - DINITROANILINE AS COMPARED TO TRIFLURALIN

The chemical was sprayed on the ground and incorporated. The seeds planted and 4 weeks later the results were read.

TABLE XIII

| Replication No. | Chemical | Rate, lb./a., a.i. | Tomato | Soybeans | Cucumber | Lambsquarter | Pigweed | Grass | Carpet Weed | Purslane |
|---|---|---|---|---|---|---|---|---|---|---|
| 1 | N-s-Bu-4-t-Bu-2,6-dinitroaniline | 1½ | 0 | 0 | 0 | 99 | 99 | 100 | 100 | 100 |
| | Trifluralin | 1½ | 40 | 0 | 100 | 99 | 100 | 100 | 100 | 100 |
| 2 | N-s-Bu-4-t-Bu-2,6-dinitroaniline | 1½ | 0 | 0 | 25 | 99 | 99 | 100 | 100 | 100 |
| | Trifluralin | 1½ | 40 | 0 | 100 | 100 | 100 | 100 | 100 | 100 |
| 3 | N-s-Bu-4-t-2,6-dinitroaniline | 1½ | 0 | 0 | 0 | 95 | 95 | 100 | 100 | 100 |
| | Trifluralin | 1½ | 0 | 0 | 55 | 99 | 100 | 100 | 100 | 100 |

WEED CONTROL AND SELECTIVITY TO ALFALFA OF N - s - BUTYL - 4 - t - BUTYL - 2,6 - DINITROANILINE COMPARED TO TRIFLURALIN

Seedbeds of clay loam were prepared and treatment by the compressed air boom method for weed control in seedling alfalfa were made on May 12 and June 3. Condition of the soil was excellent. Two replications approximately 500 ft.[2] (vol./plot 43.5 g.p.a.) were prepared, irrigated by furrow corrugates and treated prior to planting to alfalfa. Chemicals employed in these tests and rates of application were as follows:

Treatments (chemical; rate, lbs./acre, actual)

Chemical:                                       Rate, lbs./acre
    EPTC                                           3
    N-s-Bu-4-t-Bu-2,6-dinitroaniline               1

Chemical: Rate, lbs./acre
 Trifluralin ¾
 Nitralin 1
 N-s-Bu-4-t-Bu-2,6-dinitroaniline+EPTC 1+2

Weed species present were *Amaranthus retroflexus, Chenopodium album,* Kochia, *Solanum rostratum, Helianthus echinochloa* and Setaria.

Incorporation methods

EPTC, trifluralin and N-s-butyl-4-t-butyl-2,6-dinitroaniline
Double disced and double harrowed within 1 hour of application
Incorporation depth approximately 2½"
Other PPI treatments double harrowed only
Good spray conditions Alfalfa showed good tolerance to N-s-butyl-4-t-butyl-2,6-dinitroaniline at the highest rate of 2 lbs./acre. The 1½ lbs. per acre rate provided excellent broadleaf and grass control with acceptable control at 1 lb. per acre.

Trifluralin at ¾ lb. per acre provided very acceptable weed control but produced significant alfalfa stand and vigor reduction.

CROP SELECTIVITY OF N-s-BUTYL-4-t-BUTYL-2,6-DINITROANILINE COMPARED TO TRIFLURALIN

Treatments with N-s-butyl-4-t-butyl-2,6-dinitroaniline were included in multi-crop herbicide screening trial in Hawaii. This trial was on the dry side of Kauai Island in a sandy soil with 4% organic matter. Five inches of rain fell during the early stages of the trial; there was no irrigation.

TABLE XIV.—RESPONSE OF CROP SPECIES FOR WHICH N-s-BUTYL-4-t-BUTYL - 2,6 - DINITROANILINE GAVE GREATER SELECTIVITY THAN TRIFLURALIN PREPLANT INCORPORATED

| | N-s-butyl-4-t-butyl-dinitroaniline, p.p.i., 1.5 lb./a. | | Trifluralin, p.p.i., 1.5 lb./a. | |
|---|---|---|---|---|
| | Percent stand reduction | Percent growth reduction | Percent stand reduction | Percent growth reduction |
| Alfalfa | 0 | 0 | 0 | 20 |
| Trefoil | 0 | 0 | 0 | 20 |
| Red clover | 0 | 0 | 0 | 20 |
| White clover | 0 | 0 | 0 | 20 |
| Rape | 0 | 0 | 0 | 20 |
| Spinach | 0 | 0 | 20 | 30 |
| Tomatoes | 0 | 10 | 0 | 30 |
| Rice | 0 | 0 | 50 | 50 |
| Sugar beets | 0 | 0 | 90 | 90 |
| Oats | 10 | 20 | 30 | 70 |
| Rye | 0 | 0 | 30 | 30 |
| Barley | 0 | 0 | 30 | 20 |
| Peas | 0 | 0 | 30 | 30 |
| Field corn | 0 | 0 | 30 | 50 |
| Sunflower | 0 | 0 | 20 | 30 |
| Potatoes | 0 | 0 | 0 | 20 |

POTATO TRIALS WITH N-s-BUTYL-4-t-BUTYL-2,6-DINITROANILINE AND TRIFLURALIN FOR COMPARISON OF WEED CONTROL AND SELECTIVITY

Test method

Crops tested: Two rows of Irish Cobbler white potatoes, 30" spacing, planted on May 23 with the tree planter.

Weed species present for evaluation:
Pigweed—*Amaranthus retroflexus*
Lambsquarter—*Chenopodium album*
Ragweed—*Ambrosia artemisiifolia*
Barnyardgrass—*Echinochloa crusgalli*
Giant foxtail—*Setaria faberii*

Seedbed preparation: Disced three times and cultipacked twice prior to planting. Prior to the last discing 500 lbs./acre of 10–20–20 was applied.

Incorporated treatments: Applications were made on May 23 with the improved bicycle sprayed, 4 #8003 nozzles, 18" apart, 18" spray height, 20 lbs. pressure, 40 gals./acre. Treatments were incorporated with the powered rotovator. Plot size was 6' x 10'.

TABLE XV.—POTATO TRIALS

| | Incorporated | Rate, lb./a., a.i. | Potatoes | Giant Foxtail | Barnyard Glass | Lambs quarter | Pig weed | Rag weed |
|---|---|---|---|---|---|---|---|---|
| No. | Chemical | | | | | | | |
| 1 | N-s-Bu-4-t-Bu-2,6-dinitroaniline | 3/4 | 0 | 95 | 95 | 85 | 93 | 0 |
| 2 | Trifluralin | 3/4 | 23 | 95 | 95 | 87 | 95 | 0 |

N-s-butyl-4-t-butyl-2,6-dinitroaniline was as active as trifluralin on a pound-for-pound basis. However, trifluralin was causing a 23% reduction in potato growth at the ¾ lb./a. rate, whereas the N-s-butyl-4-t-butyl-2,6-dinitroaniline appeared quite selective up to as high as 1½ lbs./a.

COMPARATIVE TRIALS IN SMALL GRAIN—N-s-BUTYL-4-t-BUTYL-2,6-DINITROANILINE VS. TRIFLURALIN

Selkirk spring wheat, Erie barley and Clintland 60 oats were planted in silt loam soil and treated on May 27. *Avena fatua, Alopecurus myosuroides* and *Lolium multiflorum* were seeded in rows. Plots received 0.33 inch overhead irrigation on May 28 and a total of 5.45 inches of rainfall before ratings were made on July 21.

At the rates necessary for optimum weed control grain injury was too high. Preemergence, trifluralin was twice as active as N-s-butyl-4-t-butyl-2,6-dinitroaniline and two to three times as active preplant incorporated.

TABLE XVI.—RESPONSE OF SMALL GRAINS AND WEEDS TREATED WITH N-s-butyl-4-t-butyl-2, 6-dinitroaniline

| | | Percent plant control | | | | |
|---|---|---|---|---|---|---|
| Treatment | Rate, lbs/a., a.i. | Barley | Oats | Alopecurus sp. | Annual rye | Wild oats |
| Preplant incorporated: | | | | | | |
| N-s-butyl-4-t-butyl-2,6-dinitroaniline | 0.75 | 0 | 0 | 70 | 0 | 65 |
| Trifluralin | 0.75 | 100 | 100 | 100 | 90 | 100 |

COMPARATIVE TRIALS IN RICE—N-s-BUTYL-4-t-BUTYL-2,6-DINITROANILINE VS. TRIFLURALIN

Paddy was rotovated twice and cultipacked prior to planting Nova 66 rice, applying treatments July 3, and flooding. Barnyardgrass was broadcast on the plot area before final fitting. Irrigation and rainfall accumulated July 4 to 16 totalled 11.25 inches. Evaluations were made August 11. N-s-butyl-4-t-butyl-2,6-dinitroaniline selectivity was good; trifluralin injury was 70% at 0.5 lb./a.

TABLE XVII.—RESPONSE OF FLOODED RICE AND WEEDS TO PREEMERGENCE TREATMENT WITH N-s-BUTYL-4-t-BUTYL-2,6-DINITROANILINE

| Chemical | Rate, lb./a., a.i. | Rice | Broad-leaf weeds | Barn-yard grass |
|---|---|---|---|---|
| | | Percent plant control | | |
| N-s-butyl-4-t-butyl-2,6-dinitroaniline | 0.50 | 16 | 80 | 83 |
| Trifluralin | 0.50 | 70 | 100 | 96 |

COMPARATIVE FIELD TRIALS WITH N-s-BUTYL-4-t-BUTYL-2,6-DINITROANILINE AND KNOWN DINITROANILINE HERBICIDES

Herbicide field screening trials were conducted in Santa Isabel. The soil type varied from silty loam to silty clay loam. All plots were replicated three times.

TABLE XVIII

| Treatment | Rate, lb./a. | Cucumber | Corn | Soybeans | Ryegrass | Cotton | Tomato | Wheat | Barnyard Grass | Pigweed | Morning Glory | Coffeeweed | Purslane |
|---|---|---|---|---|---|---|---|---|---|---|---|---|---|
| Preplant incorporated: | | | | | | | | | | | | | |
| N-s-butyl-4-t-butyl-2,6-dinitroaniline | 0.75 | 0 | 3 | 0 | 97 | 0 | 0 | 40 | 73 | 77 | 0 | 0 | 97 |
| Do | 1.50 | 0 | 33 | 0 | 97 | 7 | 20 | 33 | 77 | 100 | 63 | 0 | 97 |
| Do | 3.00 | 0 | 50 | 10 | 97 | 0 | 47 | 83 | 97 | 97 | 67 | 0 | 93 |
| Trifluralin | 0.50 | 40 | 10 | 17 | 93 | 33 | 23 | 70 | 93 | 97 | 0 | 0 | 93 |
| Do | 0.75 | 43 | 33 | 33 | 100 | 0 | 40 | 83 | 93 | 97 | 10 | 7 | 97 |
| Do | 1.50 | 37 | 37 | 27 | 100 | 30 | 77 | 93 | 97 | 100 | 37 | 17 | 100 |
| Planavin | 0.50 | 27 | 27 | 3 | 57 | 0 | 7 | 60 | 60 | 63 | 63 | 0 | 67 |
| Do | 0.75 | 10 | 33 | 10 | 97 | 7 | 10 | 93 | 90 | 97 | 10 | 7 | 97 |
| Do | 1.50 | 20 | 17 | 30 | 77 | 13 | 27 | 97 | 93 | 100 | 37 | 27 | 100 |

Treatments were applied on Jan. 7 and evaluated on Feb. 10. Rain and irrigation totalled 4.45 inches during this test period.

At 1 lb./a. N-s-butyl-4-t-butyl-2,6-dinitroaniline was active against annual grass species, pigweed and purslane.

TABLE XIX.—AVERAGE PERCENT CONTROL OF CROPS AND WEED SPECIES WITH N-s-BUTYL-4-t-BUTYL-2,6-DINITROANILINE

| Treatment | Rate, lb./a. | Cucumber | Corn | Soybeans | Ryegrass | Cotton | Tomato | Wheat | Barnyard Grass | Pigweed | Purslane |
|---|---|---|---|---|---|---|---|---|---|---|---|
| Preplant incorporated: | | | | | | | | | | | |
| N-s-butyl-4-t-butyl-2,6-dinitroaniline | 1.0 | 0 | 0 | 0 | 87 | 0 | 7 | 47 | 100 | 87 | 93 |
| Trifluralin | 1.0 | 57 | 90 | 0 | 100 | 67 | 73 | 100 | 100 | 93 | 93 |
| Planavin | 1.0 | 7 | 80 | 0 | 100 | 0 | 73 | 100 | 100 | 77 | 77 |

COMPARATIVE TRIALS ON CORN

Pigweed, lambsquarter and barnyardgrass were broadcast seeded prior to last discing. Agway 800 Hybrid corn was planted and treated August 13. Subsurface moisture was adequate. Plots received a total of 4.6 inches of rain and irrigation before rating on Sept. 19.

At 2 lbs./a. N-s-butyl-4-t-butyl-2,6-dinitroaniline provided 90% control of pigweed and lambsquarter, and 100% control of barnyardgrass with excellent crop tolerance; trifluralin and nitralin reduced corn height 20% and 10% respectively. N-s-butyl-4-t-butyl-2,6-dinitroaniline was active at equal rates of trifluralin or nitralin with significantly greater safety to the corn.

TABLE XX.—RESPONSE TO LATE-PLANTED CORN AND WEEDS TO N-s-BUTYL-4-t-BUTYL-2,6-DINITROANILINE

| Chemical | Rate, lb./a., a.i. | Corn | Pigweed | Lambsquarter | Barnyard Grass |
|---|---|---|---|---|---|
| | | Percent plant control | | | |
| N-s-butyl-4-t-butyl-2,6-dinitroaniline | 2 | 0 | 90 | 90 | 100 |
| Trifluralin | 2 | 20 | 90 | 85 | 100 |
| Nitralin | 2 | 10 | 90 | 95 | 100 |

The novel herbicidal compounds of this invention can be conveniently applied as preemergence herbicides in either liquid or granular form and are preferably incorporated into the soil at planting. The compounds are generally crystalline materials with only slight solubility in water. Where liquid formulations are desired they can be compounded in the form of wettable powders or emulsifiable concentrates which can be readily diluted with water prior to application. The compounds can also be applied in the form of herbicidal dusts or combined with fertilizers or other herbicidal substances such as the N,N-dialkylthiol carbamates. Suitable granular compositions can be readily prepared by dissolving the herbicidal substance in a light organic solvent such as acetone which is then sprayed on a carrier such as attapulgite clay, vermiculite, ground corn-cob, etc. and the solvent removed by evaporation. As noted above the granular formulations and in particular a granular formulation of N-s-butyl-4-t-butyl-2,6-dinitroaniline is especially useful as a preemergence crabgrass killer. Accordingly this invention also encompasses granular formulations of the novel compounds of this invention together with a granular carrier material which can if desired also be a granular fertilizer material such as ammonium nitrate, urea prills, etc. Suitable granular formulations are those containing from about 2 to 20% by weight of active ingredient uniformly dispersed on a dry granular carrier material such as attapulgite clay, vermiculite or ground corn-cobs. The granular formulations have been found particularly well suited to preemergence application to turf grass for control of crabgrass as shown by the following test results:

PREEMERGENCE CRABGRASS WITH GRANULAR COMPOSITION OF N-s-BUTYL-4-t-BUTYL-2,6-DINITROANILINE

In early spring, test area was verticut and over-seeded with both smooth and hairy crabgrass. All treatments were applied on May 15, using a Lawn-Beauty granular applicator with a bin vibrator attached to give uniform application. With this procedure, a minimum of four passes was made to apply chemical on plots measuring 4' x 12'. Actual treatment area was 3' x 12'.

Rainfall of 0.04" fell on plots the same day as application; first appreciable rainfall occurred three days after treatment, recorded at 0.60".

to give a final concentration of 5 p.p.m. or 10 p.p.m. as indicated. Effect on the weeds is noted and recorded about three weeks after application.

| Repli- | Chemical | Rate, lb/a. a.i. | July 9 | | | | July 24 | | | | September 4 | | | |
|---|---|---|---|---|---|---|---|---|---|---|---|---|---|---|
| cate | | | I | II | III | Avg. | I | II | III | Avg. | I | II | III | Avg. |
| | | | Percent crabgrass control, preemergence | | | | | | | | | | | |
| 1 | N-s-butyl-4-t-butyl-2,6-dinitroaniline. | 1 | 80 | 100 | 75 | 85 | 60 | 80 | 40 | 60 | 35 | 40 | 10 | 28 |
| 2 | do | 2 | 97 | 95 | 95 | 96 | 90 | 75 | 70 | 78 | 70 | 85 | 60 | 72 |
| 3 | do | 4 | 100 | 100 | 100 | 100 | 100 | 100 | 100 | 100 | 98 | 100 | 95 | 98 |
| 4 | do | 8 | 100 | 100 | 100 | 100 | 100 | 100 | 100 | 100 | 100 | 100 | 98 | 99 |
| | | | Turf tolerance, percent injury | | | | | | | | | | | |
| 1 | N-s-butyl-4-t-butyl-2,6-dinitroaniline. | 1 | 0 | 0 | 0 | 0 | 0 | 0 | 0 | 0 | 0 | 0 | 0 | 0 |
| 2 | do | 2 | 0 | 0 | 0 | 0 | 0 | 0 | 0 | 0 | 0 | 0 | 0 | 0 |
| 3 | do | 4 | 0 | 0 | 0 | 0 | 0 | 0 | 0 | 0 | 0 | 0 | 0 | 0 |
| 4 | do | 8 | 0 | 0 | 0 | 0 | 0 | 0 | Tr | Tr | 0 | 0 | 0 | 0 |

Emulsifiable concentrates are formulated by dissolving the herbicidal compound in an organic solvent such as an aromatic oil which is readily dispersed in water and if desired one or more co-solvents such as the higher alcohols, ketones, butyrolactone, etc. can be used. Such concentrates are preferably formulated with wetting agents. Any suitable wetting agent either anionic, cationic or non-ionic may be employed.

The herbicidal substance, whether in liquid or granular form, are applied to crop areas where it is desired to eliminate grasses and broadleaf weeds at rates varying from about 0.25 to 16.0 lbs./a., either as preemergent application to the soil at planting or by incorporating into the soil at planting. Preferred rates of application will of course depend upon the particular crop species and the nature of the area to be treated though ordinarily effective weed control without injury to crops such as corn, potatoes, soybeans and vine crops such as cucumbers, melons, etc. can be achieved by applying one of the novel herbicidally active substances of this invention at amounts between about 0.5 and about 5 lbs./a.

As noted above the novel dinitroaniline derivatives of this invention can if desired be used in combination or combined with other known herbicides. In particular combinations of N-s-butyl-4-t-butyl-2,6-dinitroaniline and EPTC have been found to be highly effective preferably as preplant incorporation treatments for potatoes. Thus this invention encompasses also the use of the novel compounds of Formula IV preferably N-s-butyl-4-t-butyl-2,6-dinitroaniline in combination with one or more known herbicides such that for each part by weight of a compound of Formula IV there is also employed from about .25 to 4.0 parts by weight of a known herbicide such as chloramben, EPTC and the like. The combinations will ordinarily be employed in amounts such that the compounds of this invention are applied at a rate between about 1 and about 2 lbs./a.

The compounds of this invention have also shown aquatic herbicidal activity as demonstrated by the following test results:

AQUATIC WEED CONTROL TRIALS

A container having growing specimens of the aquatic weed species in water is treated by adding the test substance dissolved in a suitable solvent at rates sufficient

AQUATIC WEED HERBICIDAL ACTIVITY

| | Concentration, p.p.m. | Percent control | |
|---|---|---|---|
| | | Duckweed | Salvinia |
| Compound number: | | | |
| 2 | 10 | 90 | 100 |
| 3 | 5 | 80 | 80 |
| 4 | 5 | 50 | 70 |
| 5 | 5 | 100 | 100 |
| 6 | 5 | 90 | 60 |
| 9 | 5 | 100 | 100 |
| 10 | 10 | 50 | 60 |
| 12 | 5 | 0 | 70 |
| 14 | 5 | 30 | 60 |
| 16 | 5 | 0 | 30 |
| 17 | 5 | 70 | 100 |
| 18 | 5 | 90 | 90 |
| 19 | 5 | 90 | 30 |
| 21 | 5 | 30 | 110 |

As has been shown above those novel compounds, particularly N-2-butyl-4-t-butyl-2,6-dinitroaniline are safe to rice and in addition to preplant incorporation treatments can in certain cases be employed as preemergence herbicides such as in transplanted rice paddies. In this as well as the preplant incorporation treatments the compounds of this invention show notably less soil persistence than has known dinitroaniline herbicides, rendering them more desirable in terms of undesirable residues.

The compounds have also shown growth regulant activity when applied to plants such as tobacco and similar species. For use in the control of tobacco suckers the novel compounds of this invention are applied after topping of the tobacco and preferably applied to the stem area of the tobacco plant which can of course be conveniently accomplished by spraying the entire plant. The compounds of this invention are suitably applied to topped tobacco plants by spraying at rates of 1 to 6 lbs./acre and optimally at about 2 lbs./acre preferably in combination with a suitable surfactant material in an amount between about .05 to about 2% by weight of active ingredient which is preferably the N-s-butyl-4-t-butyl-2,6-dinitroaniline.

The combination of N-s-butyl-4-t-butyl-2,6-dinitroaniline and surfactant is preferably applied by spraying in about 50 to 200 gallons of water per acre. Suitable surfactants are the known anionic or nonionic and particularly the nonionic surfactants customarily employed in formulating herbicidal materials. Examples of anionic surfactants are the sulfonates such as the alkylbenzene sulfonates, the sulfated surfacants such as sulfated alcohols, acids, amides, esters, sulfated natural fats and oils, etc.; the phosphate esters such as alkyl polyphosphate surfactants; suitable nonionic materials include the polyoxyethylene surfactants such as the ethoxylated alkyl phenols, the ethoxylated aliphatic alcohols, etc. and the carboxylic esters such as e.g. polyethylene glycol esters, polyoxyethylene fatty acid esters; and others.

The effect of the compounds of this invention for inhibition of tobacco suckers is illustrated by the following field tests:

TOBACCO GROWTH REGULANT EFFECTS

Pennbel tobacco plants were transplanted to the field on June 11 with a mechanical transplanter. They were treated Aug. 12 immediately after plants were hand topped down to the first 6" wide leaf and suckers over 1" long were removed. Plants had just started to bloom. Plants received 0.5 inch overhead irrigation just after spraying and 15.9 inches of rain and irrigation for the duration of the test. Observations were made on Sept. 29.

Excellent tobacco sucker control was obtained with N-s-butyl-4 - t - butyl-2,6 - dinitroaniline+Triton X–100 (2 lbs./a.+.1%); control equalled that of MH–30 at 3 lbs./a. Increasing the spray volume from 100 to 150 gals./a. with N-s-butyl-4-t-butyl-2,6-dinitroaniline alone improved sucker control. N-s-butyl-4-t-butyl-2,6-dinitroaniline+1-Decanol+Triton X–100 (1 lb/a.+1%+.1%) was superior to N-s-butyl-4-t-butyl-2,6-dinitroaniline alone at 1 or 2 lbs./a. Alone, 1-Decanol+Triton X–100 (1%–2%+.1%) had no effect on sucker growth. No injury was noted from any treatment.

cooled and filtered. The product was then recrystallized from boiling hexane, to give 168 grams 2,6-dinitro-4-t-butylchlorobenzene in the form of light yellow needles melting at 114–116° C.

EXAMPLE 2

1 gram of 2,6-dinitro-4-t-butylchlorobenzene was allowed to react with 1 gram of s-butylamine by adding the amine dropwise to a refluxing mixture of 50 m. dry toluene, and the 2,6-dinitro-4-t-butylchlorobenzene. After complete addition, the mixture was refluxed eight hours, cooled to room temperature, the amine hydrochloride filtered off, and toluene and unreacted amine were removed under reduced pressure. The thick material that resulted was dissolved in hot ethanol and the product was crystallized upon cooling to yield N-s-butyl-4-t-butyl-2,6-dinitroaniline melting at 60–72° C.

EXAMPLE 3

Two and six-tenths grams (.01 mole) of 2,6-dinitro-4-t-butylchlorobenzene was reacted with 3.1 grams of 40% aqueous solution of methylamine in 50 ml. ethanol. The temperature was slowly increased as follows: 30° C. for 1 hour, 40° C. for 1 hour, 50° C. for 1 hour, then 80° C. for 5 hours. When the reaction was complete about 100 ml. $H_2O$ was added, precipitating the product. This was filtered, washed with portions of $H_2O$ and upon recrystallization from ethanol yielded 2.5 grams of N-methyl-2,6-dinitro-4-t-butylaniline as orange needles melting at 129–130° C.

By using a method similar to those described in the preceding examples, the following additional 4-t-butyl-2,6-dinitroaniline derivatives were prepared by reacting 4-t-butyl-2,6-dinitrochlorobenzene with the appropriate amine. These compounds together with those mentioned in the preceding examples are listed in Table I hereinabove.

TOBACCO SUCKER CONTROL WITH N-s-BUTYL-4-T-BUTYL-2,6-DINITROANILINE

| Chemical | Rate, lb./a. | 150 g.p.a. | |
|---|---|---|---|
| | | Percent control [1] | Percent reduction [2] |
| N-s-butyl-4-t-butyl-2,6-dinitroaniline | 1.0 | 15 | 10 |
| Do | 2.0 | 60 | 93 |

| | | .1% Triton X–100 plus 100 g.p.a. | | 1% Decanol plus .1% X–100 plus 100 g.p.a. | |
|---|---|---|---|---|---|
| | | Percent control,[1] 100 g.p.a. | Percent reduction,[2] 100 g.p.a. | Percent control,[1] 150 g.p.a. | Percent reduction [2] 150 g.p.a. |
| N-s-butyl-4-t-butyl-2,6-dinitroaniline | 1.0 | 65 | 55 | 78 | 73 |
| Do | 2.0 | 98 | 98 | | |

[1] Reduction in number of suckers over 4" in length.
[2] Decrease in length of suckers on the plants.

The preparation and use of the novel compounds of this invention will be further understood from the specific examples which are intended to be illustrative only.

EXAMPLE 1

Following the method of Dutton, et al. (Canadian Journal of Chemistry, vol. 31, p. 685, 1953), 200 grams (1.32 moles) 4-t-butylphenol was dissolved in 480 ml. glacial acetic acid and added dropwise over a period of one hour to a stirred solution of 320 ml. of 90% nitric acid and 600 ml. of glacial acetic acid at −10 to −15° C. After complete addition the temperature rises to 0 to −5° C. The reaction mixture is then allowed to come to room temperature and maintained there for one hour. The mixture is then poured onto cracked ice, diluted with water and cooled. The product is then filtered, washed with $H_2O$, dried and recrystallized from hot hexane to give 180 grams of 2,6-dinitro-4-t-butylphenol in the form of fine yellow needles melting at 94–95° C.

180 grams (.75 mole) of 2,6-dinitro-4-t-butylphenol thus prepared was placed in a mixture of 113 grams (.95 mole) thionyl chloride, 55 grams (.76 mole) dimethylformamide and 300 ml. of dry toluene. The mixture was stirred and heated to reflux temperature for 15 hours after which time the thionyl chloride, DMF and toluene were removed under reduced pressure until a slush remained. Hexane was then added to the reaction vessel, the mixture

EXAMPLE 4

4.5 grams (0.11 mole) of sodium hydroxide was dissolved in 100 ml. of methanol. 32.4 grams (0.10 mole) of 4-t-butyl-2,6-dinitrophenol was dissolved in the resultant solution. 23 grams (0.12 mole) of tosyl chloride was added and the mixture stirred at 35° C. for 1.5 hours. The solid was filtered and washed with water to obtain 33 grams (84% yield) of a light yellow tosylate product melting at 124–130°

29.4 grams (0.10 mole) of tosylate and 14.6 grams (0.20 mole) of s-butylamine in 200 ml. of water was stirred and heated at reflux for 3 hrs. After cooling to room temperature the mixture was filtered and the solid washed with water. The dried product, N-s-butyl-4-t-butyl-2,6-dinitroaniline, weighed 23.6 grams (80% yield).

EXAMPLE 5.—2 LBS./GAL. EMULSIFIABLE CONCENTRATE

| Chemical | Lbs. | Percent by weight |
|---|---|---|
| N-s-butyl-4-t-butyl-2,6-dinitroaniline | 2.02 | 23.40 |
| Atlox 3387 | 1.00 | 11.59 |
| Panasol AN–3 | 5.61 | 65.01 |

Note.—Specific gravity: 1.037 at 20° C; manufacturing directions: Combine ingredients and stir to a homogenous solution.

EXAMPLE 6

| | |
|---|---|
| N-s-butyl-4-t-butyl-2,6-dinitroaniline, percent | 4.2 |
| Vermiculite, Trenton #4, percent | 95.8 |
| | 100.0 |
| Acetone solvent, lbs. | 15.0 |

Manufacturing directions: The N-s-butyl-4-t-butyl-2,6-dinitroaniline is put into solution with acetone and the solution sprayed onto tumbling vermiculite. The solvent is evaporated off.

EXAMPLE 7

| Chemical | Lbs. | Percent by weight |
|---|---|---|
| N-s-butyl-4-t-butyl-2,6-dinitroaniline | 4.244 | 50.48 |
| Toximul D | 0.420 | 5.00 |
| Dimethylformamide | 0.999 | 11.88 |
| Xylene (0.868 at 20° C.) | 2.745 | 32.64 |
| Total | 8.048 | 100.00 |

NOTE.—Specific gravity: 1.010 at 20° C.; manufacturing directions: Add ingredients and stir until solution is achieved and specific gravity is correct.

I claim:
1. A method for inhibiting the growth of germinating and seedling broadleaf weeds and weed grasses in crop growing areas of land which comprises incorporating into the solid bed prepared for planting crops an herbicidally effective amount of N-(sec-butyl)-4-(t-butyl)-2,6-dinitroaniline.

References Cited

UNITED STATES PATENTS

| | | | |
|---|---|---|---|
| 3,332,769 | 7/1967 | Soper | 71—121 |
| 3,518,076 | 6/1970 | Wright | 71—121 |
| 3,518,309 | 6/1970 | Soper | 71—121 |
| 3,111,403 | 11/1963 | Soper | 71—121 |
| 3,257,190 | 6/1966 | Soper | 71—121 |

FOREIGN PATENTS

| | | | |
|---|---|---|---|
| 917,253 | 1/1963 | Great Britain | 71—121 |

LEWIS GOTTS, Primary Examiner

G. HOLLRAH, Assistant Examiner

U.S. Cl. X.R.

260—577, 71—67, 78

UNITED STATES PATENT OFFICE
CERTIFICATE OF CORRECTION

Patent No. 3,672,866　　　　　　　　Dated June 27, 1972

Inventor(x) John Joseph Damiano

It is certified that error appears in the above-identified patent and that said Letters Patent are hereby corrected as shown below:

Claim 1, Column 24, line 5 - delete "solid" and insert --soil--

Signed and Sealed this

Third Day of August 1976

[SEAL]

Attest:

RUTH C. MASON
*Attesting Officer*

C. MARSHALL DANN
*Commissioner of Patents and Trademarks*